July 2, 1929.  G. A. TAYLOR  1,719,092
PISTON
Filed Aug. 7, 1925   2 Sheets-Sheet 1
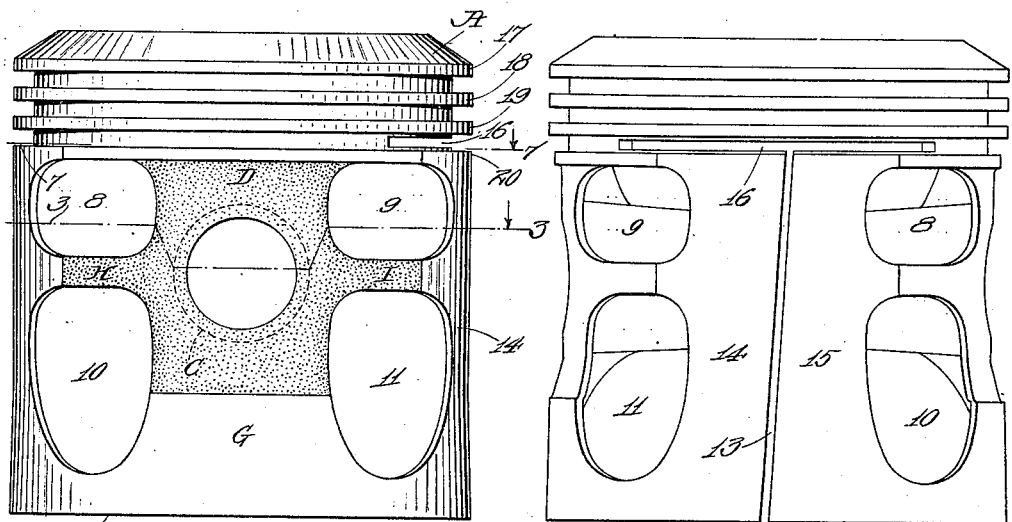
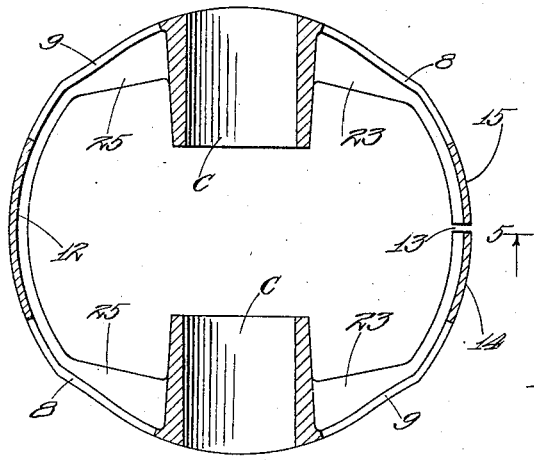
Fig. 3.
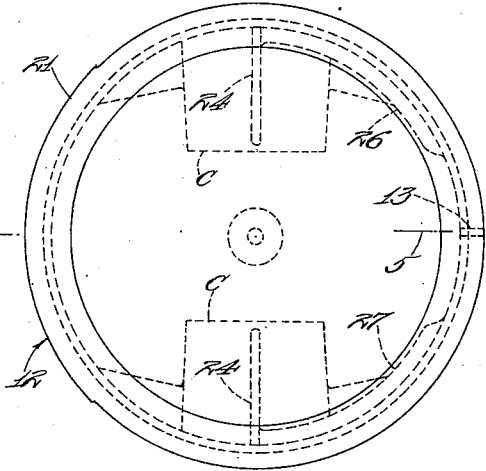
Fig. 4.
INVENTOR:
George A. Taylor.
by Macleod, Calm, Copeland & Shea
Attys.

July 2, 1929.  G. A. TAYLOR  1,719,092
PISTON
Filed Aug. 7, 1925  2 Sheets-Sheet 2

INVENTOR
George A. Taylor
by Macleod, Calvert Copeland
Attys

Patented July 2, 1929.

1,719,092

UNITED STATES PATENT OFFICE.

GEORGE A. TAYLOR, OF BOSTON, MASSACHUSETTS, ASSIGNOR, BY MESNE ASSIGNMENTS, TO IDA L. TAYLOR, OF HYDE PARK, MASSACHUSETTS.

PISTON.

Application filed August 7, 1925. Serial No. 48,833.

My invention relates to a cast metal piston and particularly to cast iron pistons of the cylindrical type commonly employed in internal combustion engines. As is well-known to those skilled in the art, cast iron, except for its weight, is superior for the manufacture of pistons to other metals owing to peculiarities of its structure and its nature. Aluminum and alloy pistons, although superior in weight, cause much trouble owing to their lack of durability. Many attempts have been made to reduce the weight of cast iron pistons, as for instance by making the castings very thin or by constructing them in so-called "slipper" form, but it has been found in practice that such pistons are not altogether satisfactory because they do not provide the proper bearing surfaces for the areas where the force is exerted by the piston on the cylinder walls. Experience has proven that cylindrical pistons, that is, pistons having a cylindrical skirt which forms a continuous bearing surface over the entire circumference of the piston at the bottom, are, except for weight, the most satisfactory. My present invention therefore has for its object to provide a piston the weight of which approximates the weight of an aluminum piston, but which is of the cylindrical type and provides proper bearing surfaces at the necessary points and makes suitable provision for heat transference from the piston to the cylinder wall.

The invention will be fully understood from the following description when taken in connection with the accompanying drawings and the novel features thereof will be pointed out and clearly defined in the claims at the close of this specification.

In the drawings:

Figs. 1 and 2 are side elevations, taken at right angles to each other, of the piston embodying my invention.

Fig. 3 is a section on line 3—3, Fig. 1.

Fig. 4 is a plan view of the piston shown in Fig. 1.

Figure 6:
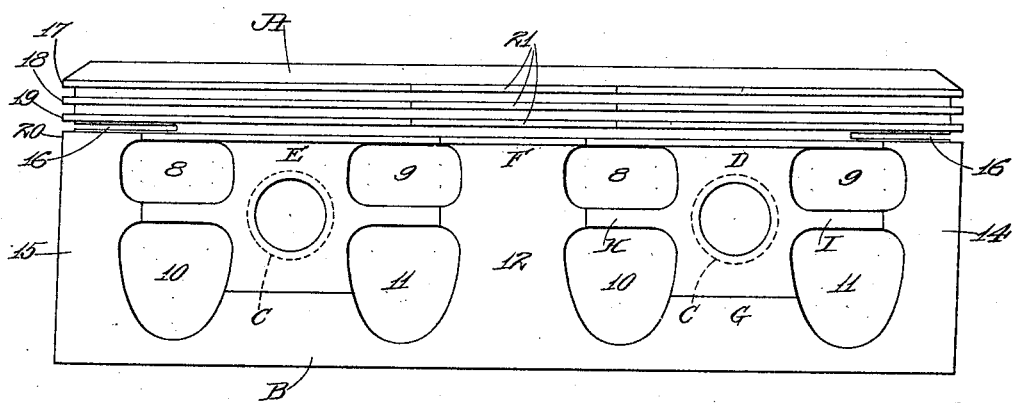
Fig. 6 is a development of the exterior of the piston showing the three-point suspension of the skirt.
Figure 7:
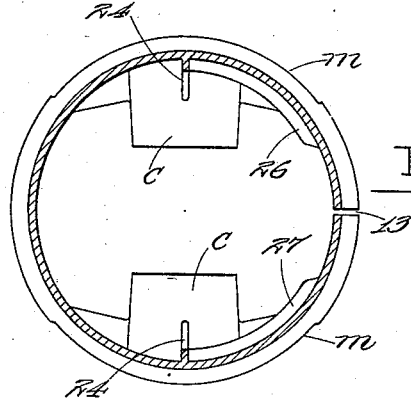
Fig. 7 is a section on the line 7—7, Fig. 1, showing the manner in which the lands adjacent the ring grooves are relieved.
Figure 8:
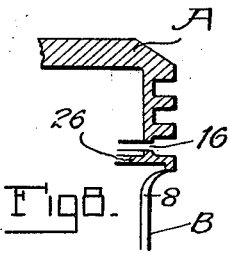
Fig. 8 is a sectional detail view taken upon the line 8—8 of Fig. 5.

Referring now to the drawings, the piston consists essentially of a head A, a continuous circumferential skirt B, and piston pin bearings or bosses C, C. The skirt is pierced on each side by four large holes, 8, 9, 10 and 11, which are arranged in pairs, one above the other, and on opposite sides of the pin bosses C, C. On the explosion pressure side there is formed a vertical bearing surface 12 which is continuous and unbroken from the head to the lower edge of the skirt. On the opposite side of the skirt, that is, on the minimum pressure side, is a similar bearing surface separated by a slit 13 into two areas 14 and 15. Above this split minimum pressure bearing area is a horizontal slit 16 which is intercepted by the vertical slit 13 and separates the minimum pressure bearing surface from the head, so that this portion of the skirt is free to be compressed circumferentially. This construction, taken in connection with the holes in the skirt, forms a three-point connection between the skirt and the head. This will readily be understood from an examination of Fig. 6 which is a development of the piston. The three points of suspension are respectively over the two pin bosses, these points being designated respectively D and E, and over the bearing surface 12 on the explosion pressure side, this point being designated F. Except at these three points, the skirt is separated from the head by the holes and by the horizontal slot 16.

Each piston pin bearing C (see Fig. 1) is connected to the head and skirt in four directions; upwardly, as shown at D, downwardly to the bottom of the skirt, as shown at G, horizontally to the explosion pressure side by the web H which separates the holes 8 and 10 and horizontally in the opposite direction by the web I which separates the holes 9 and 11.

The stippled areas surrounding the piston pin bosses are relieved in casting, the remaining portions of the piston being machined and preferably ground in accordance with common practice in the manufacture of pistons. The lands 17, 18, and 19 adjacent the several ring grooves in the head are also relieved, the relieved portion extending throughout the circumference except over the bearing surface 12 on the explosion pressure side as shown in Fig. 4. Furthermore, the metal which lies between the lowest ring groove and the holes 8 and 9 and the cast relieved portion is itself relieved as shown at m. This construction assists materially in the operation of the piston since oil scraped off the cylinder wall by the edge of the lowest ring on the down stroke of the piston passes into the holes 8 and 9 and does not accumulate. The upper ends 20 of the bearing surfaces 12, 14 and 15, are unrelieved, being of the full diameter of the cylinder, and therefore actually contact with the cylinder wall and afford additional bearing surface for the piston. The form of the lands 17, 18 and 19 is an important feature of my piston and is an important improvement over prior practice, because heretofore, it has been customary to make the lands between the piston rings of a diameter smaller than the other portions of the piston so that the lands have not contacted with the cylinder walls. By making the lands of the full diameter of the cylinder on the explosion pressure side and by relieving them throughout the rest of the circumference the piston is given an additional bearing surface on the explosion pressure side which reduces materially the tendency of the piston to rock in the cylinder, that is, to oscillate about the axis of the piston pin. Furthermore, since the lands are actually in contact with the cylinder walls the transfer of heat from the piston head is materially improved.

Figure 5:
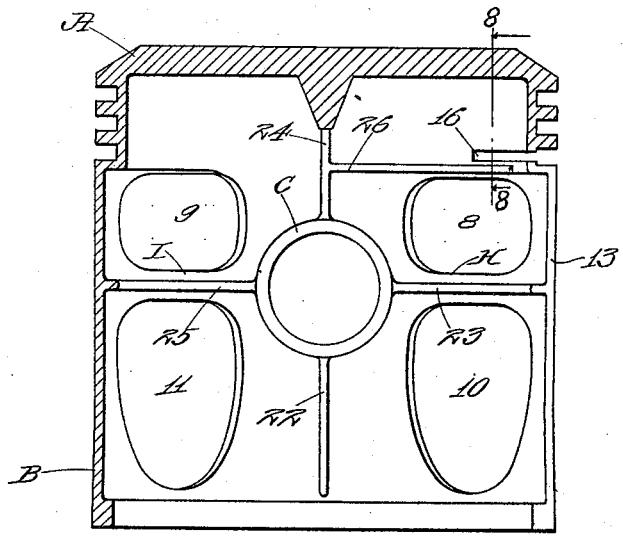
Fig. 5 is a vertical section on line 5—5, Fig. 4, looking in the direction of the arrows, and shows the interior ribbing.

To make it possible to reduce the weight of metal employed by making holes in the walls, I cast the piston with ribs on the interior surface which strengthen it and stiffen it over the necessary areas. These ribs or webs will be best understood from Figs. 3, 4 and 5. There are four ribs arranged at right angles to each other radiating from each piston pin boss C. These ribs are designated 22, 23, 24 and 25 respectively. One of these webs 22 extends from the piston pin boss C downwardly to a point near the lower edge of the piston. Another vertical rib 24 extends upwardly from the piston pin boss C to the interior surface of the head A. Horizontal webs 23 and 25 extend tend sidewise and stiffen the connections I and H. Extending from the rib 24 and adjacent the upper edge of the skirt, that is, in a plane just below the plane of the slot 16 are two other ribs 26 and 27 which extend forward toward the vertical slot 13 and stiffen the upper edge of the minimum pressure side of the skirt of the piston. These ribs give the necessary resistance to bending but at the same time the skirt of the piston on the minimum pressure side is sufficiently flexible so that if desired the piston can be made in tapered form and be made slightly oversize, being compressed when it is inserted in the cylinder.

From the foregoing it will be seen that the explosion pressure side of the piston is practically rigid being unslotted and being heavily ribbed on the interior and therefore will not be appreciably deformed when the piston is inserted in the cylinder, and will afford a broad unyielding bearing for the explosion pressure, while the opposite side of the piston, being slotted and not connected with the head can be compressed and can yield as required without appreciably affecting the shape of the explosion pressure side.

Pistons embodying my invention when made in cast iron are not much heavier than the ordinary aluminum pistons but owing to the superior qualities of cast iron are much more durable and cause much less trouble. Being made from cast iron they are also considerably less expensive than when made from aluminum.

What I claim is:

1. The improved piston for an internal combustion engine having a head with ring grooves therein, a skeleton skirt and pin bosses integral with said skirt, said skirt including on the explosion pressure side a solid bearing portion and on the opposite side a split bearing portion, and there being webs connecting the pin bosses to the head, to the sides of the bearing portion, and to the lower part of the skirt and said skirt being connected to the head over the pin bosses and over the bearing portion on the explosion side and being elsewhere free from the head.

2. The improved piston for internal combustion engines having a head with ring grooves therein and a skirt having a continuous circumferential bearing portion at the bottom, a vertical bearing portion on the explosion pressure side, a split bearing portion on the opposite side, bosses between said bearing portions and connected thereto by web members, said skirt being connected to the head at three points only, to wit: above the bearing portion on the explosion pressure side and above the two piston pin bosses.

3. The improved piston for internal combustion engines having a head with ring grooves therein, the lands adjacent the ring grooves being relieved except on the explosion pressure side.

4. A cast iron piston comprising a head and a skirt, said skirt being separated from the head except in three places, two of which are over the respective pin bearings and the third being midway circumferentially of the piston pin bearings.

5. A cast iron piston comprising a head and a skirt, said skirt being of skeleton form provided with piston pin bearings and being split on the side opposite to that subjected to the explosion pressure, said piston pin bearings being connected vertically with the head and the bottom of the skirt and horizontally with the bearing areas on the explosion and opposite sides respectively and there being a stiffening web on the interior of the piston on a level with the top edge of the skirt and on the side of the skirt between the vertical plane of the piston pin bearings and the vertical split in the skirt.

6. A cast iron piston comprising a head and a skirt, the head being provided with ring grooves, the skirt being provided with piston pin bosses about which the exterior of the skirt is relieved in casting there being holes in the skirt adjacent the pin bosses and near the upper edge of the skirt, said holes and said cast relieved portion being separated from the lowest ring groove by a land which is itself relieved for the portion which is adjacent the cast relieved portion and the holes.

7. A cast iron piston comprising a head and a skirt, said skirt on the minimum pressure side being slit and being separated from the head by a horizontal slit which renders the minimum pressure side compressible and there being along the inner edge of the skirt a substantially horizontal web directly below said horizontal slit and extending inwardly beyond the surface of the head.

8. A piston comprising a head, a skeleton skirt split on one side and separated from the head by a horizontal slit to render the same compressible, a circumferential web immediately adjacent said horizontal slit, and piston pin bosses connected to said head and skirt, said skirt having at least four apertures surrounding and adjacent to each of said piston pin bosses.

9. A cast iron piston comprising a head, a skeleton skirt split on the minimum pressure side and separated from the head by a horizontal slit which renders the same compressible, and piston pin bosses connected to said head and skirt, said skirt having at least four apertures surrounding and adjacent to each of said piston pin bosses, and having also longitudinal and circumferential stiffening webs extending from said bosses between said apertures, there being along the inner edge of the skirt an additional circumferential web immediately adjacent said horizontal slit.

10. The improved piston for internal combustion engines, comprising a head and a skirt, said skirt being of skeleton form provided with piston pin bosses and being split on the side opposite to that subjected to the explosion pressure, said piston pin bearing being connected vertically with the head and the bottom of the skirt and horizontally with the bearing areas on the explosion and opposite sides respectively and there being a stiffening web on the interior of the piston on a level with the top edge of the skirt and on the side of the skirt between the vertical plane of the piston pin bearings and the vertical split in the skirt.

11. The improved piston for internal combustion engines, comprising a head and a skirt, the head being provided with ring grooves, the skirt being provided with piston pin bosses about which the exterior of the skirt is relieved, there being holes in the skirt adjacent the pin bosses and near the upper edge of the skirt, said holes and said relieved portions being separated from the lowest ring groove by a land which is itself relieved for the portion which is adjacent the relieved portion and the holes.

12. The improved piston for internal combustion engine, comprising a head and a skirt, said skirt on the minimum pressure side being slit and being separated from the head by a horizontal slit which renders the minimum pressure side compressible and there being along the inner edge of the skirt a substantially horizontal web directly below said horizontal slit extending inwardly beyond the surface of said head.

In testimony whereof I affix my signature.

GEORGE A. TAYLOR.